(12) United States Patent
Wada

(10) Patent No.: US 8,462,252 B2
(45) Date of Patent: Jun. 11, 2013

(54) SOLID STATE IMAGING DEVICE, DRIVING METHOD FOR SOLID STATE IMAGING DEVICE, IMAGING APPARATUS, AND IMAGE INPUT APPARATUS

(75) Inventor: Kazushi Wada, Kanagawa (JP)

(73) Assignee: Sony Corporation, Tokyo (JP)

( * ) Notice: Subject to any disclaimer, the term of this patent is extended or adjusted under 35 U.S.C. 154(b) by 789 days.

(21) Appl. No.: 11/500,922

(22) Filed: Aug. 9, 2006

(65) Prior Publication Data

US 2007/0064138 A1 Mar. 22, 2007

(30) Foreign Application Priority Data

Aug. 17, 2005 (JP) .................. 2005-236297
Jun. 6, 2006 (JP) .................. 2006-157741

(51) Int. Cl.
*H04N 5/217* (2011.01)
*H04N 3/14* (2006.01)
*H04N 5/335* (2011.01)
*H01L 27/00* (2006.01)

(52) U.S. Cl.
USPC ........... 348/312; 348/241; 348/294; 348/302; 348/303; 348/311; 250/208.1

(58) Field of Classification Search
USPC .................. 250/208.1; 348/222.1, 241, 243, 348/294–324; 257/297
See application file for complete search history.

(56) References Cited

U.S. PATENT DOCUMENTS

| | | | |
|---|---|---|---|
| 7,038,723 B1 * | 5/2006 | Kuroda et al. ............ | 348/312 |
| 2004/0263652 A1 * | 12/2004 | Oda ................ | 348/272 |
| 2006/0023097 A1 * | 2/2006 | Watanabe ............ | 348/308 |

FOREIGN PATENT DOCUMENTS

| | | |
|---|---|---|
| JP | 63-294080 A | 11/1988 |
| JP | 05-130525 A | 5/1993 |
| JP | 07-030102 A | 1/1995 |
| JP | 08-130684 A | 5/1996 |
| JP | 08-279965 A | 10/1996 |
| JP | 2001-016510 A | 1/2001 |
| JP | 2003-153084 A | 5/2003 |
| JP | 2004-221339 A | 8/2004 |
| JP | 2004-328680 A | 11/2004 |
| JP | 2005-013279 A | 1/2005 |
| JP | 2005-020275 A | 1/2005 |
| JP | 2005-286470 A | 10/2005 |
| JP | 2005-304009 A | 10/2005 |
| JP | 2006-042121 A | 2/2006 |
| JP | 2006-109194 A | 4/2006 |

OTHER PUBLICATIONS

Japanese Office Action issued Sep. 9, 2009 for corresponding Japanese Application No. 2006-157741.
Japanese Office Action issued Sep. 6, 2011 for related Japanese Application No. 2009-246038.
Japanese Office Action issued Jan. 31, 2012 for related Japanese Application No. 2009-246038.

* cited by examiner

*Primary Examiner* — Michael Osinski
(74) *Attorney, Agent, or Firm* — Rader, Fishman & Grauer PLLC

(57) ABSTRACT

At a transfer electrode to which a normally low transfer pulse is applied, the time period in which the negative potential is applied is long, and an electric field is applied to a gate insulating film, such that the device's reliability decreases. To overcome this drawback, a negative side potential (VL') of a normally low vertical transfer pulse (Vφ3, Vφ4) is set smaller in the absolute value than a negative side potential (VL) of a normally high vertical transfer pulse (Vφ1, Vφ2). Thereby, while the influence of increase in the dark current is being suppressed, the electric field being applied to the gate insulating film is reduced.

25 Claims, 8 Drawing Sheets

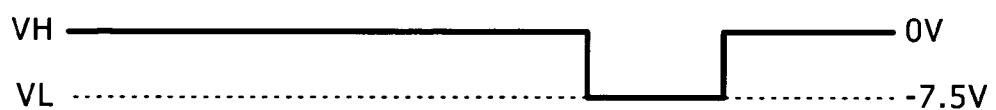
FIG. 8A
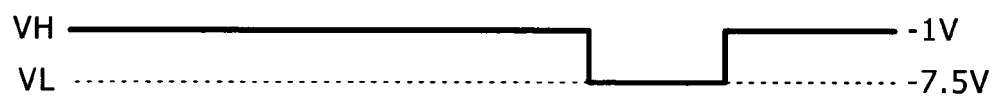
FIG. 8B
FIG. 9
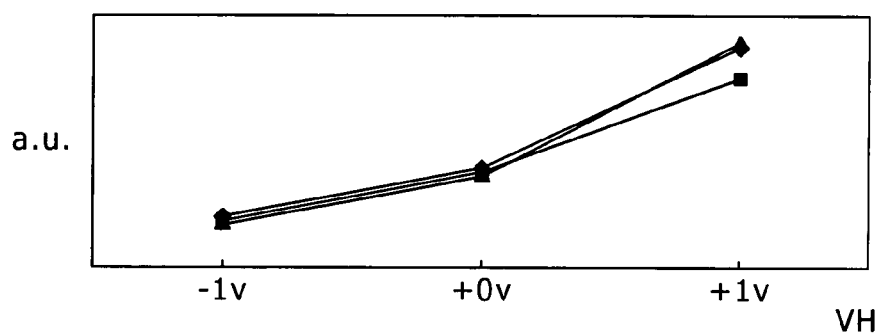
FIG. 10
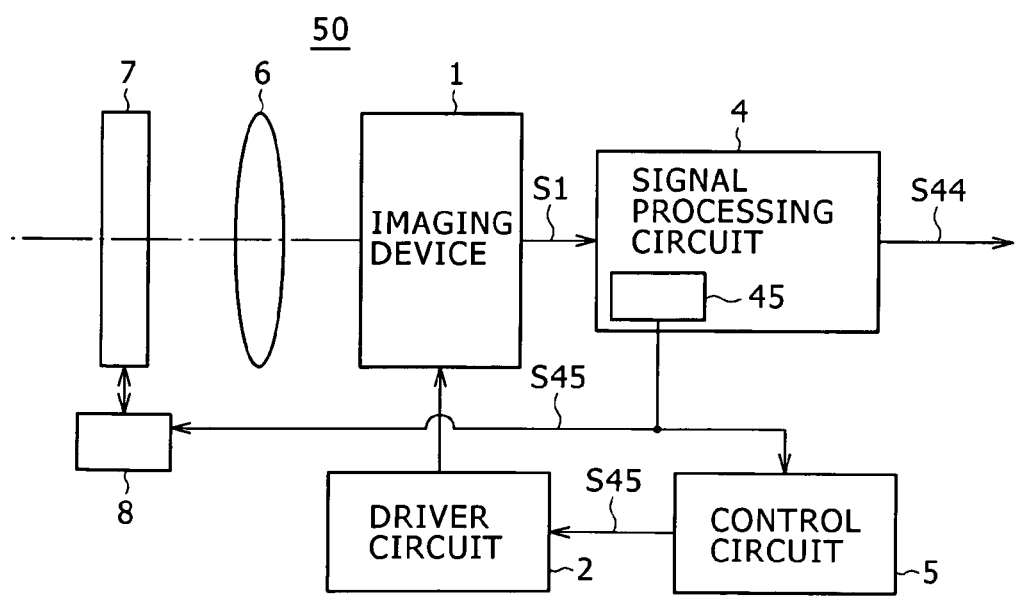

SOLID STATE IMAGING DEVICE, DRIVING METHOD FOR SOLID STATE IMAGING DEVICE, IMAGING APPARATUS, AND IMAGE INPUT APPARATUS

CROSS REFERENCES TO RELATED APPLICATIONS

The present invention contains subject matter related to Japanese Patent Applications JP 2005-236297 filed in the Japanese Patent Office on Aug. 17, 2005, and JP 2006-157741 filed in the Japanese Patent Office on Jun. 6, 2006, the entire contents of which are incorporated herein by reference.

BACKGROUND OF THE INVENTION

1. Field of the Invention

The present invention relates to a solid state imaging device, a driving method for the solid state imaging device, and an imaging apparatus. More specifically, the invention relates to a charge-transfer solid state imaging device represented by a CCD (charge coupled device) solid state imaging device, a driving method for the solid state imaging device, an imaging apparatus using the solid state imaging device, and an image input apparatus.

2. Description of the Related Art

A charge-transfer solid state imaging device, such as a CCD solid state imaging device, employs a method called "pinning operation" for suppressing the increase of the dark current occurring in vertical transfer registers. More specifically, the imaging apparatus employs a driving method that performs transfer driving of vertical transfer registers by using four phase-differential transfer pulse trains each having two voltage values. Of the two voltage values, one value is 0 V as the potential of the positive side (high level side) and the other value is a negative side voltage value VL as the potential of the negative side (low level side) (for example, see Japanese Unexamined Patent Application Publication (JP-A) No. 2004-328680 (such as FIG. 4 and corresponding to portions of Specification).

The JP-A No. 2004-328680 discloses a driving method for a CCD (charge coupled device), in which four phase-differential transfer pulse trains each having two voltage values respectively at the high and low levels are used to thereby perform transfer driving of vertical transfer registers.

FIGS. 1A to 1D, respectively, shows waveform diagrams of the vertical transfer pulses Vφ1 to Vφ4 as described in JP-A No. 2004-328680. In the drawing figures, a case is shown in which the high level voltage is 0[V], and the low level voltage is a negative side voltage value VL.

As shown in FIGS. 1A to 1D, the four phase-differential vertical transfer pulse trains (Vφ1 to Vφ4) for driving the vertical transfer register are composed of the vertical transfer pulses Vφ1 and Vφ2 that are each at a "normally high" level and that each have a longer high level (0[V], for example) duration than a low level (negative side voltage value VL, for example) duration, and the vertical transfer pulses Vφ3 and Vφ4 that are each at a "normally low" level and that each have a longer low level duration than a high level duration.

The "normally high" level refers to a voltage level that is high during a standby time period inclusive of a light reception time, and the "normally low" level refers to a voltage level that is low during the standby time period.

As the potential on a silicon surface functioning as a vertical charge transfer channel is brought close to the negative side, the potential on the silicon surface is reduced, and holes are likely to accumulate thereon. As such, the influence of the surface level that is caused by a defect on the silicon surface, that is, generation of electrons from the surface level, which is a dominant cause of dark current generation, is significantly suppressed. As a consequence, an increase of dark current can be suppressed. Such a phenomenon is caused by an effect called "pinning effect."

In the event that a low level potential is applied to the transfer electrode of the vertical transfer register from the state where a high level potential is applied to the transfer electrode, a high pinning effect takes place. In the potential range therebetween, however, the pinning effect decreases as the potential is closer to the high level side and becomes higher as the potential is closer to the low level side.

According to the pinning effect, by the application of the negative voltage to the transfer electrode of the vertical transfer register from the state where 0 V is applied to the transfer electrode, an inversion layer is formed on the silicon surface, also the surface level of the vertical transfer register is filled with holes, and the amount of electrons being generated from the surface level, which is the dominant cause of dark current generation, are significantly reduced, and whereby an increase of the dark current can be suppressed. As such, the potential on the negative side of the transfer pulse for driving the vertical transfer register is very important.

In addition, Japanese Unexamined Patent Application Publication No. 2004-221339 discloses a technique for reducing noise attributed to the dark current. According to the technique, in a vertical transfer register, the number of vertical transfer electrodes (the number of storage gates), which are driven by normally high pulses respectively having a low pinning effect and a long high level duration, are reduced, thereby suppressing the occurrence of the dark current.

SUMMARY OF THE INVENTION

As shown in FIGS. 1A to 1D, for example, of the normally high four phase-differential vertical transfer pulse trains Vφ1 to Vφ4, the vertical transfer pulses Vφ1 and Vφ2 are each normally high and each have the high level (0 V) duration longer than the low level (negative side voltage value VL) duration, and the vertical transfer pulses Vφ3 and Vφ4 are each normally low and each have the longer low level duration than the duration of the high level.

At the transfer electrode to which the normally low vertical transfer pulse Vφ3, Vφ4 is applied, a time period of application of the negative potential is long, and the electric field is applied to an insulating film, such that there is concerning about the deterioration of device reliability, particularly, the deterioration of the transfer efficiency of the vertical transfer register. While the negative potential can be reduced (brought close to 0 V) to reduce the electric field being applied to the gate insulating film, the pinning effect is decreased thereby, such that there occurs a problem of increasing the dark current.

Nevertheless, however, with reference to, for example, the example shown in FIG. 1, at the transfer electrode to which the normally low vertical transfer pulse Vφ3, Vφ4 is applied, the time period of application of the negative potential is long, and the high electric field is applied to the gate insulating film for a long time. As such, there is concern about the deterioration of the device reliability in association with, for example, a deterioration of the quality of the insulating film. As a consequence, an electric field controlling power for a transfer channel is reduced, and hence the transfer efficiency of the vertical transfer register is reduced. In order to prevent the reduction of the device reliability, the negative potential can be reduced (brought close to 0 V). In this case, however, since the pinning effect is decreased, the dark current is significantly increased.

In contrast, however, the time period in which the high level potential, i.e., 0 V, is applied is long at the normally high vertical transfer pulse Vφ1, Vφ2. Accordingly, if the high level could be reduced as much as possible, the pinning effect would be intensified, thereby enabling the dark current to be reduced.

However, when the high level potential is reduced, the amplitude of the vertical transfer pulse is reduced, thereby reducing the transfer efficiency of the vertical transfer register.

In the example disclosed in Japanese Unexamined Patent Application Publication No. 2004-221339, the number of normally low horizontal driving is increased from two to three. As such, while the dark current is reduced, the number of electrodes, which can possibly degrade the reliability of device operation, is increased for the reason that, for example, the quality of the gate insulating film is degraded. Consequently, the disclosed example has a drawback of further reducing the transfer efficiency.

Thus, the transfer efficiency (and signal read efficiency) of the vertical transfer register and the intensity of the pinning effect for preventing the occurrence of the dark current operate in a trade-off relationship with one another, and therefore make it difficult to operate the imaging device efficiently while suppressing the occurrence of dark current.

Under these circumstances, a high demand is placed for techniques that operate the imaging device with high transfer efficiency while suppressing the occurrence of a dark current or while reducing the influence of a reduction in the transfer efficiency.

In view of the above, in the present invention, it is desirable to provide a solid state imaging device capable of improving device reliability without increasing the dark current, a driving method for the solid state imaging device, and an imaging apparatus.

In order to achieve the above, in one embodiment of the present invention, a configuration is employed in which, for example, in a solid state imaging device including a charge transfer section that is transfer-driven (driven for performing transfer operation) by a normally high transfer pulse having a longer duration of a positive side potential than a duration of a negative-side potential and a normally low transfer pulse having a longer duration of a negative side potential than a duration of a positive side potential, the negative side potential of the normally low transfer pulse is set smaller in the absolute value than the negative side potential of the normally high vertical transfer pulse.

In any one of a solid state imaging device thus configured, a driving method therefore, and an imaging apparatus using the solid state imaging device, the dark current in a vertical transfer section primarily occurs below a transfer electrode to which the normally high vertical transfer pulse is applied. This is attributed to the fact that, in the normally high vertical transfer pulse, the duration of the negative side potential is short and the pinning effect duration is short. As such, substantially no influence of the dark current occurs even in the case where the negative side potential of the normally low vertical transfer pulse in which the occurrence amount of the dark current is very small relative to that in the normally high vertical transfer pulse which is somewhat reduced in the absolute value. On the other hand, however, while a high electric field is applied to a gate oxide film, the electric field is applied thereto through the transfer electrode to which the normally low vertical transfer pulse is applied. Accordingly, a reduction in the absolute value of the negative side potential of the normally low vertical transfer pulse leads to a reduction of the electric field being applied to the gate insulating film.

A driving device for a solid state imaging device in another embodiment according to the present invention transfers, in a charge transfer section, a signal charge occurring corresponding to light reception. The driving device includes a transfer pulse supply circuit that generates a first transfer pulse and a second transfer pulse and that supplies the generated first transfer pulse and second transfer pulse to the charge transfer section of the solid state imaging device, wherein the first transfer pulse has a positive side potential during a standby time period inclusive of a light reception time in which the signal charge occurs and becomes a pulse having a negative side potential at a time of charge transfer, and the second transfer pulse has a negative side potential during the standby time period and becomes a pulse having a positive side potential at a time of charge of transfer, the negative side potential being smaller in an absolute value than the negative side potential of the first transfer pulse.

Preferably, in the embodiment, the transfer pulse supply circuit renders the negative side potential of the second transfer pulse to be intermittently smaller in the absolute value than the negative side potential of the first transfer pulse.

According to the configuration, in the transfer pulse supply circuit, the second transfer pulse in which the potential in a standby time period (standby level) is the negative side potential is generated so that the potential is smaller in the absolute value than the negative side potential of the first transfer pulse. The second transfer pulse and the first transfer pulse are supplied from the transfer pulse supply circuit to the solid state imaging device, thereby transferring the signal charge.

In the second transfer pulse having the negative side potential in the standby time period, the time period in which the pinning effect is working is long. In contrast, in the first transfer pulse, a time period in which the pinning effect is low is long. As such, when causing the negative side potential of the second transfer pulse to vary so that the potential becomes small in the absolute value, a reduction degree of the pinning effect is small compared to a case where the potential is varied in the first transfer pulse.

However, the pinning effect is intensified due to the variation to the negative side potential, and hence the effect remains for some time. In the event that the negative side potential of the second transfer pulse is intermittently varied, while the pinning effect does not vary, the drive capacity is increased compared to the event in which the negative side potential of the second transfer pulse is not intermittently varied.

A driving device for a solid state imaging device in another embodiment according to the present invention transfers, in a charge transfer section, a signal charge occurring corresponding to light reception, converts the signal charge into an image signal, and outputs the image signal in a charge transfer section. The driving device includes a feedback control circuit that is capable of supplying a first transfer pulse and a second transfer pulse respectively as driving pulses of the charge transfer section to the solid state imaging device and that is capable of causing a standby level of at least one of the first transfer pulse and the second transfer pulse to vary in accordance with the image signal received from the solid state imaging device, wherein the first transfer pulse has a positive side potential during a standby time period inclusive of a light reception time in which the signal charge occurs and becomes a pulse having a negative side potential at a time of charge transfer, and the second transfer pulse has a negative side potential during the standby time period and becomes a pulse having a positive side potential at the time of charge transfer.

Preferably, in this embodiment, the feedback control circuit includes a transfer pulse supply circuit that supplies the first transfer pulse and the second transfer pulse to the solid state imaging device; a variable gain amplifier that inputs the image signal from the solid state imaging device and that amplifies the image signal; and a control circuit that detects a brightness of an imaging screen taken by the solid state imaging device in accordance with the image signal and that supplies a gain corresponding to the detected brightness to the variable gain amplifier so that the gain can be varied, wherein the transfer pulse supply circuit inputs the gain from the control circuit and causes the standby level to vary in accordance with the input gain.

According to the configuration described above, since the image signal from the solid state imaging device includes the information of brightness of the imaging screen, the brightness can be detected, whereby the transfer pulse supply circuit can cause the standby level in accordance with the gain obtained in the event of gain control performed corresponding to the detected brightness. In this case, the pinning effect can be intensified or maintained, and concurrently, the influence of a reduction in the drive capacity can be minimized by reducing the drive capacity only when the influence is insignificant.

An image input apparatus in another embodiment according to the present invention includes a solid state imaging device that, in a charge transfer section, transfers a signal charge occurring corresponding to light reception; a driver circuit for the solid state imaging device; and an optical system that guides image light from a photographic subject onto an imaging surface of the solid state imaging device. The driver circuit includes a transfer pulse supply circuit that generates a first transfer pulse and a second transfer pulse and that supplies the generated first transfer pulse and second transfer pulse to the charge transfer section of the solid state imaging device, wherein the first transfer pulse has a positive side potential during a standby time period inclusive of a light reception time in which the signal charge occurs and becomes a pulse having a negative side potential at a time of charge transfer, and the second transfer pulse has a negative side potential during the standby time period and becomes a pulse having a positive side potential at a time of charge of transfer, the negative side potential being smaller in an absolute value than the negative side potential of the first transfer pulse.

An image input apparatus in another embodiment according to the present invention includes a solid state imaging device that, in a charge transfer section, transfers a signal charge occurring corresponding to light reception; a driver circuit for the solid state imaging device; an optical system that guides image light from a photographic subject onto an imaging surface of the solid state imaging device; and means capable of outputting a signal varying corresponding to an amount of a signal charge of the solid state imaging device. The driver circuit includes a transfer pulse supply circuit that is capable of supplying a first transfer pulse and a second transfer pulse respectively as driving pulses of the charge transfer section to the solid state imaging device and that is capable of causing a standby level of at least one of the first transfer pulse and the second transfer pulse to vary in accordance with the signal varying corresponding to the amount of the signal charge, wherein the first transfer pulse has a positive side potential during a standby time period inclusive of a light reception time in which the signal charge occurs and becomes a pulse having a negative side potential at a time of charge transfer, and the second transfer pulse has a negative side potential during the standby time period and becomes a pulse having a positive side potential at the time of charge transfer.

A driving method for a solid state imaging device in one embodiment according to the present invention is for driving a solid state imaging device that transfers, in a transfer section, a signal charge occurring corresponding to light reception. The driving method includes a first step of generating a first transfer pulse and a second transfer pulse, wherein the first transfer pulse has a positive side potential during a standby time period inclusive of a light reception time in which the signal charge occurs and becomes a pulse having a negative side potential at a time of charge transfer, and the second transfer pulse has a negative side potential during the standby time period, the negative side potential being smaller in an absolute value than the negative side potential of the first transfer pulse; and a second step of performing driving by supplying the generated first transfer pulse and second transfer pulse to the charge transfer section of the solid state imaging device.

A driving method for a solid state imaging device is for driving a solid state imaging device that transfers, in a charge transfer section, a signal charge occurring corresponding to light reception, converts the signal charge into an image signal, and outputs the image signal. The driving method includes a first step of generating a first transfer pulse and a second transfer pulse, wherein the first transfer pulse has a positive side potential during a standby time period inclusive of a light reception time in which the signal charge occurs and becomes a pulse having a negative side potential at a time of charge transfer, and the second transfer pulse has a negative side potential during the standby time period and becomes a pulse having a positive side potential at the time of charge transfer; a second step of performing driving by supplying the generated first transfer pulse and second transfer pulse to the charge transfer section of the solid state imaging device; and a third step of causing a standby level of at least one of the first transfer pulse and the second transfer pulse to vary in accordance with the image signal received from the solid state imaging device, while generating and supplying the first transfer pulse and the second transfer pulse.

According to the embodiment of the present invention, the influence of an increase in the dark current is being suppressed, and the electric field being applied to the gate insulating film can be reduced in the manner that the negative side potential of the normally low vertical transfer pulse is set smaller in the absolute value than the negative side potential of the normally high vertical transfer pulse. Accordingly, the device reliability can be improved without increasing the dark current.

Further, according to the embodiment of the present invention, the imaging device can be operated at a high transfer efficiency while the occurrence of the dark current is being suppressed or while the influence of the reduction in the transfer efficiency is being reduced.

BRIEF DESCRIPTION OF THE DRAWINGS

In the accompanying drawings,

FIGS. 8A and 8B, respectively, are waveform diagrams of a four phase-differential vertical transfer pulse train in the case of a relatively bright image screen and a relatively dark image screen in the third embodiment;

FIG. 9 is a graph descriptive of effects of positive side potential regulation (third embodiment);

FIG. 10 is a block diagram of an example of the configuration of an image input apparatus in the fourth embodiment.

DETAILED DESCRIPTION OF THE PREFERRED EMBODIMENTS

Embodiments of the present invention will be described in detail herebelow.

Figure 1:
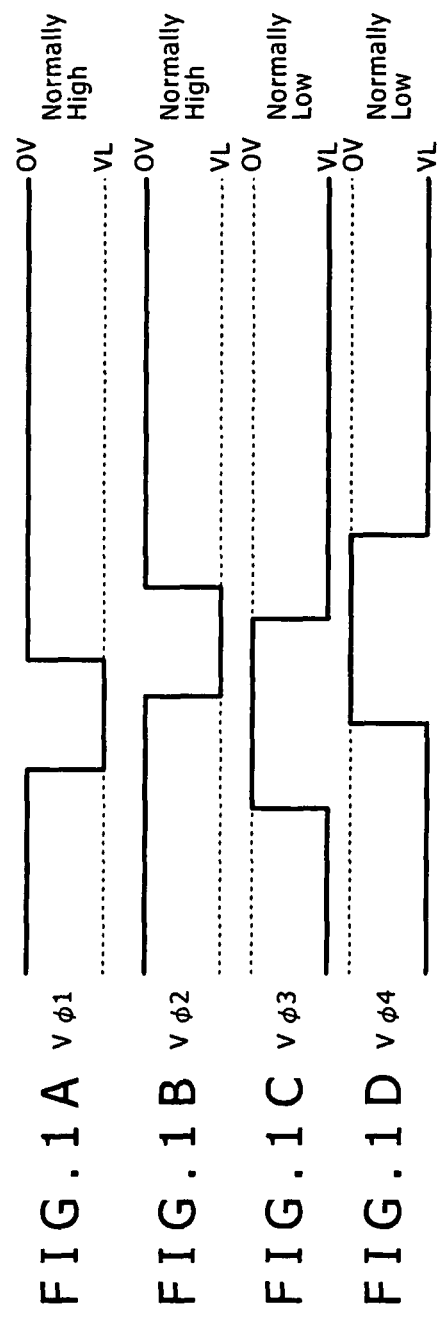
FIGS. 1A to 1D, respectively, are waveform diagrams showing general four phase-differential vertical transfer pulse trains (V$\phi$1 to V$\phi$4)
Figure 2:
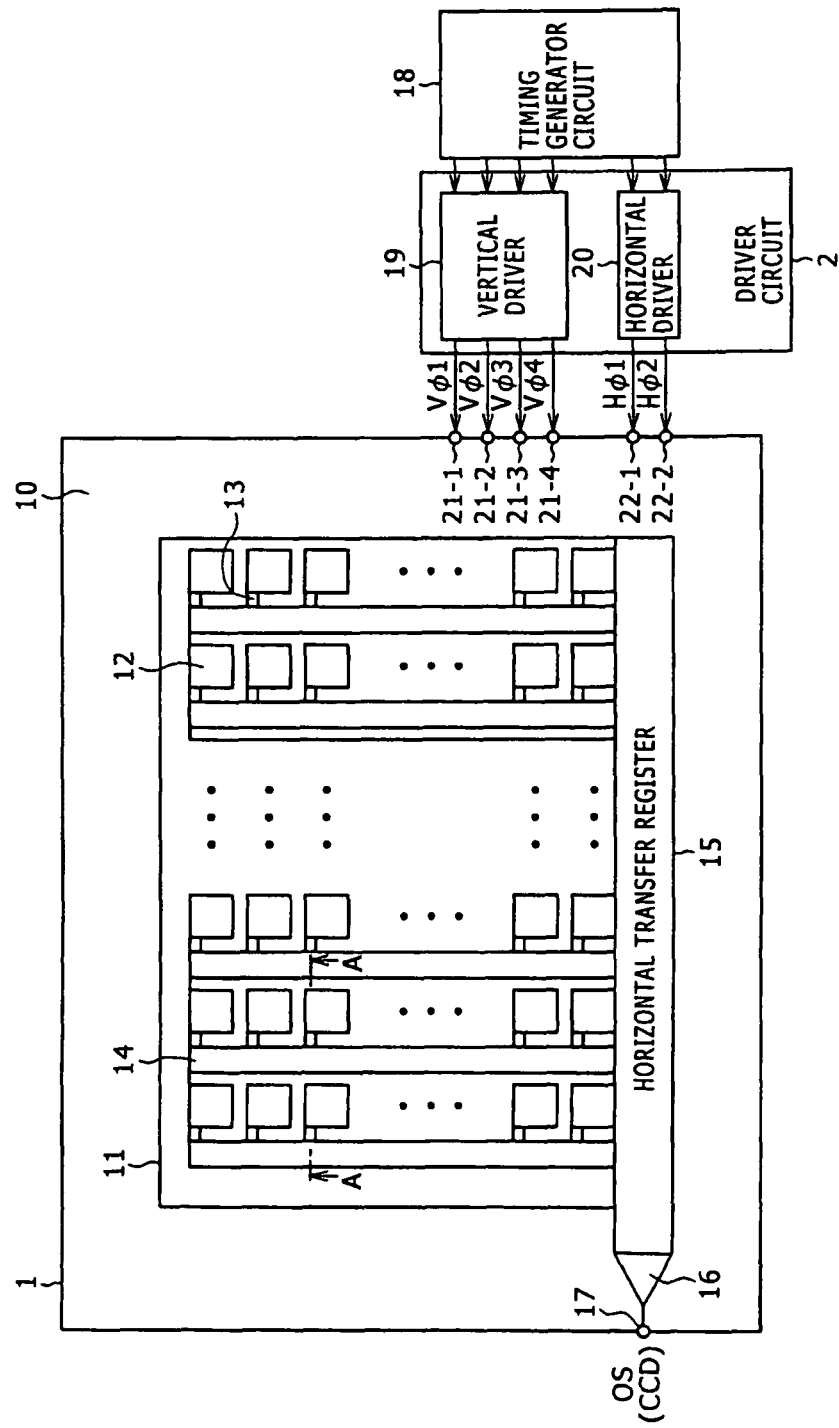
FIG. 2 is a schematic view showing the configuration of a CCD usable in first to fourth embodiments, and a driver circuit for the CCD.

FIG. 2 is a schematic view showing the configuration of a charge-transfer solid state imaging device, such as, for example, a CCD solid state imaging device, employing the present invention.

A CCD 1 shown in FIG. 2 includes an imaging section 11 and a peripheral section 10 inclusive of, for example, output circuits, input and output terminals, and buses.

With reference to FIG. 2, the imaging section 11 is configured to include a plurality of light receiver sections 12 (pixels) and a plurality of vertical transfer registers 14 (vertical transfer sections). The light receiver sections 12 are two-dimensionally arranged in a matrix on the semiconductor substrate 10, and respectively convert incident light into a signal charge corresponding to the amount of the incident light. The vertical transfer registers 14 are arrayed in units of a column of the matrix array of the light receiver section 12, and respectively transfer the signal charge photoelectrically converted by the light receiver section 12 and read from the light receiver section 12 through a readout gate section 13. In this case, the respective signal is transferred in units of the column along the vertical direction (upward-downward direction in the drawing).

Channel stop regions 29 are each disposed between the vertical transfer register 14 and the light receiver section 12 of the adjacent pixel column. The channel stop region 29 prevents entrainment of the charge of a different pixel into the transfer signal. Although not specifically shown, channel stop regions 29 are arranged also in the vertical direction of the respective light receiver sections 12, and prevent entrainment of pixel signals.

A horizontal transfer register 15 (horizontal transfer section) is provided on one of the upper and lower sides of the imaging section 11. The horizontal transfer register 15 sequentially transfers, along the horizontal direction (rightward-leftward direction in the drawing), signal charges shifted in and sent from the plurality of vertical transfer registers 14. An output section 16 is provided to an end portion on a transfer destination side of the horizontal transfer register 15.

The output section 16 is configured of, for example, a floating diffusion amplifier, converts to a signal voltage the signal charge sequentially transferred by the horizontal transfer register 15, and outputs the voltage as an image signal S1 (CCDout) externally of the CCD 1 through an output terminal 17.

A TG circuit 18 (TG: timing generator), a vertical driver 19, and a horizontal driver 20 are provided externally of the semiconductor substrate 10. The TG circuit 18 generates various timing signals for driving, for example, the vertical transfer register 14 and the horizontal transfer register 15, in accordance with a vertical synchronous signal VD, a horizontal synchronous signal HD, and a master clock McK. More specifically, the TG circuit 18 generates, for example, four phase-differential vertical transfer pulse trains V$\phi$1 to V$\phi$4 for transfer driving of the vertical transfer register 14 and two-phase horizontal transfer pulses H$\phi$1 and H$\phi$2 for transfer driving of the horizontal transfer register 15.

More specifically, the vertical driver 19 generates, CLEAN SPECIFICATION application Ser. No. 11/500,922 for example, the four phase-differential vertical transfer pulse trains V$\phi$1 to V$\phi$4 as driving pulses for the vertical transfer register 14.

The horizontal driver 20 generates, for example, the two-phase horizontal transfer pulses H$\phi$1 and H$\phi$2 as driving pulses for the horizontal transfer register 15.

The driver circuit 2 is a circuit that generates driving pulses for the vertical transfer registers 14 and the horizontal transfer register 15 in accordance with various signals from the TG circuit 18.

More specifically, the driver circuit 2 includes the vertical driver 19, which generates the driving pulses for the vertical transfer registers 14, and the horizontal driver 20, which generates the driving pulses for the horizontal transfer register 15. Of these drivers, the vertical driver 19 corresponds to one example of a transfer pulse supply circuit of the present invention.

The four phase-differential vertical transfer pulse trains V$\phi$1 to V$\phi$4, respectively, are supplied through the vertical driver 19 to terminals 21-1 to 21-4 electrically coupled to corresponding transfer electrodes (not shown) of the vertical transfer registers 14. Although not shown in the drawings, the four phase-differential vertical transfer pulse trains V$\phi$1 to V$\phi$4 are supplied to respective transfer electrodes of the vertical transfer registers 14 from both right and left sides of the imaging section 11 to prevent a propagation delay resulting from, for example, resistances and parasitic capacitances of wire lines transferring the pulses. The two-phase horizontal transfer pulses H$\phi$1 and H$\phi$2 are supplied through the horizontal driver 20 to terminals 22-1 and 22-2 of the horizontal transfer register 15 electrically coupled to corresponding transfer electrodes of the horizontal transfer register 15.

The four phase-differential vertical transfer pulse trains V$\phi$1 to V$\phi$4, respectively, are supplied through the vertical driver 19 to the terminals 21-1 to 21-4 electrically coupled to the corresponding transfer electrodes (not shown) of the vertical transfer registers 14.

Preferably, the four phase-differential vertical transfer pulse trains V$\phi$1 to V$\phi$4 are supplied to the respective transfer electrodes of the vertical transfer registers 14 from both right and left sides of the imaging section 11 to prevent a propagation delay resulting from, for example, resistances and parasitic capacitances of wire lines transferring the pulses.

The two-phase horizontal transfer pulses H$\phi$1 and H$\phi$2 are supplied from the horizontal driver 20 through the terminals 22-1 and 22-2 of the horizontal transfer register 15 electrically coupled to the corresponding transfer electrodes of the horizontal transfer register 15.

In an embodiment of the present invention, a feature is provided to set the potentials of the four phase-differential vertical transfer pulse trains $V\phi 1$ to $V\phi 4$ that are used for transfer driving of the vertical transfer registers, as described further below.

Figure 3:
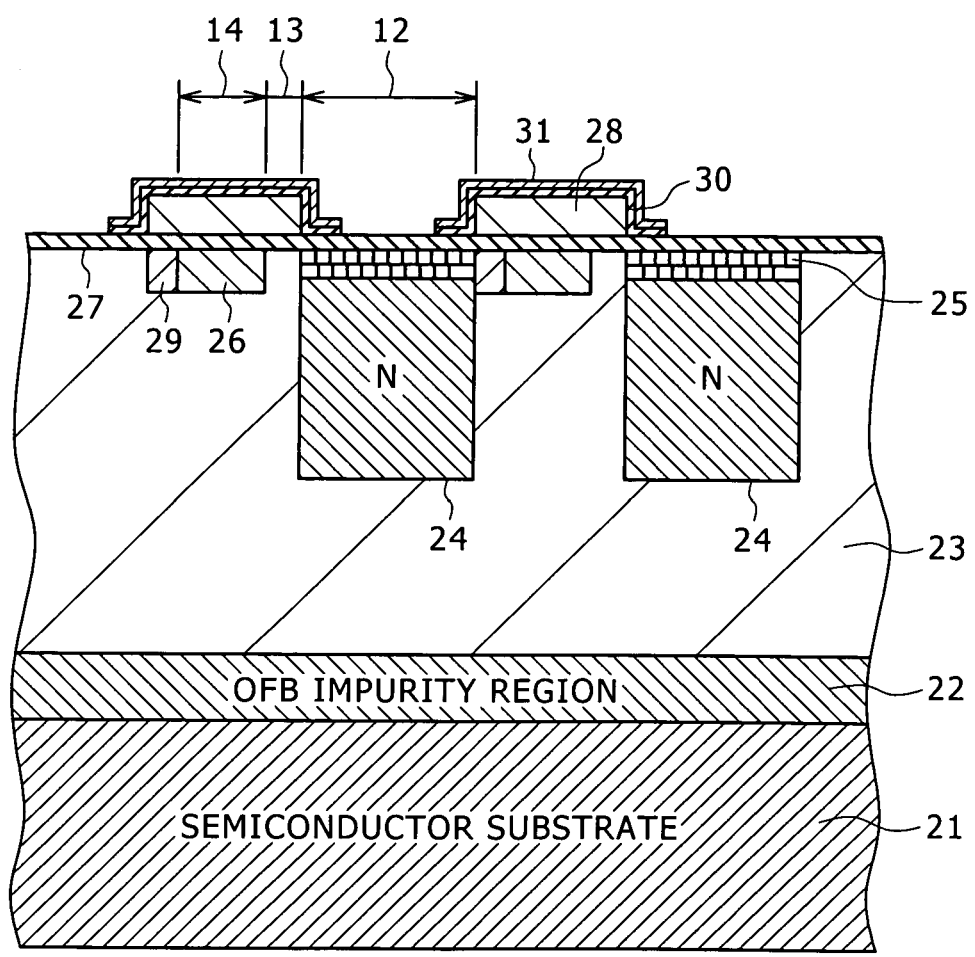
FIG. 3 is a cross sectional view of an relevant portion taken along the line A-A of FIG. 2.

FIG. 3 is a cross sectional view of a relevant portion taken along the line A-A of FIG. 2.

With reference to FIG. 3, for example, a p-type well region 22 functioning as an OFB (overflow area) impurity region is formed on an n-type semiconductor substrate 21. In addition, various impurity regions constituting the light receiver section 12, the readout gate section 13, and the vertical transfer register 14 are formed on a p-type semiconductor layer 23.

More specifically, the light receiver section 12 includes a photodiode forming a p-n junction from the p-type semiconductor layer 23 and an n-type impurity region 24 formed inside the p-type semiconductor layer 23. The light receiver section 12 further includes, in a surface side portion in the n-type impurity region 24, a hole storage region 25 formed of a p-type impurity region.

The vertical transfer register 14 includes a transfer channel 26 formed of an n-type impurity region formed on a surface layer portion of the p-type semiconductor layer 23, and a polysilicon transfer electrode 28 formed on a substrate surface above the transfer channel 26. A channel stop region 29 formed of a high-concentration p-type impurity region is formed along the transfer channel 26.

The readout gate section 13 sharedly uses a part of the transfer electrode 28 of the vertical transfer register 14 as a gate electrode, and has a MIS (metal-insulator-semiconductor) structure formed of the gate electrode and a gate insulating film 27 underlying the gate electrode and the p-type semiconductor layer 23. The gate insulating film 27 is formed of either a single-layer insulation film or a multilayer film of, for example, an ONO (oxide-nitride-oxide) structure.

A light shield film 31 of, for example, aluminium or tungsten, is formed via an interlayer insulation film 30 in such a manner as to cover the respective vertical transfer register 14 except for the light receiver section 12.

Setting of the potentials of four phase-differential vertical transfer pulse trains $V\phi 1$ to $V\phi 4$, which is a feature of the present invention, will be described with reference to the, first and second embodiments.

First Embodiment

FIGS. 4A to 4D, respectively, are waveform diagrams of four phase-differential vertical transfer pulse trains according to the first embodiment. Referring to the figures, the four phase-differential vertical transfer pulse trains ($V\phi 1$ to $V\phi 4$) are composed of normally high transfer pulses (normally high vertical transfer pulses $V\phi 1$ and $V\phi 2$ in the present embodiment) that each have a longer duration of the positive side potential (0 V in the present embodiment) than a duration of the negative side potential (negative voltage value VL in the present embodiment), and normally low transfer pulses (vertical transfer pulses $V\phi 3$ and $V\phi 4$ in the present embodiment) that each have a longer duration of the negative side potential than the duration of the positive side potential.

In the first embodiment, a feature is that a negative side potential VL' of the normally low vertical transfer pulse $V\phi 3$, $V\phi 4$ is set smaller in absolute value than the negative side potential VL of the normally high vertical transfer pulse $V\phi 1$, $V\phi 2$ (the potential VL' is brought close to 0 V). As one example, the negative side potential VL' of the vertical transfer pulse $V\phi 3$, $V\phi 4$ is set smaller by about 5% in voltage value than the negative side potential VL of the vertical transfer pulses $V\phi 1$ and $V\phi 2$.

The negative side potential VL' of the vertical transfer pulse $V\phi 3$, $V\phi 4$ can be set easily in the manner that a vertical transfer pulse of a "0[V]-VL" amplitude supplied from the TG circuit 18 is divided by, for example, a resistive potential divider circuit in the vertical driver 19. Thereby, a power source dedicated for the negative side potential VL' does not have to be provided. In the case that this configuration is employed, the resistive potential divider circuit in the vertical driver 19 has a function of potential setting means.

The potential setting means, however, is not limited to the resistive potential divider circuit in the vertical driver 19. The configuration may instead be such that, for example, a resistive potential divider circuit provided on the semiconductor substrate 10, in which the vertical transfer pulse $V\phi 3$, $V\phi 4$ of a "0[V]-VL'" amplitude is generated in accordance with the vertical transfer pulse of the "0[V]-VL" amplitude supplied from the vertical driver 19.

Thus, the negative side potential VL' of the normally low vertical transfer pulse $V\phi 3$, $V\phi 4$ is set smaller in the absolute value than the negative side potential VL of the normally high vertical transfer pulse $V\phi 1$, $V\phi 2$, and the vertical transfer registers 14 are transfer-driven by the four phase-differential vertical transfer pulse trains $V\phi 1$ to $V\phi 4$ inclusive of the vertical transfer pulses $V\phi 3$ and $V\phi 4$. Thereby, the following effects and advantages can be obtained.

More specifically, the dark current in the vertical transfer register 14 primarily occurs below the transfer electrode to which the normally high vertical transfer pulse $V\phi 1$, $V\phi 2$ is applied. This is attributed to the fact that, in the normally high vertical transfer pulse $V\phi 1$, $V\phi 2$, the duration of the negative side potential is short and the duration of the pinning effect is short. As such, no influence of the dark current occurs even in the case where the negative side potential VL' of the normally low vertical transfer pulse $V\phi 3$, $V\phi 4$ in which an occurrence amount of the dark current is very small relative to that in the normally high vertical transfer pulse $V\phi 1$, $V\phi 2$ which is somewhat reduced in the absolute value.

On the other hand, however, while the high electric field is applied to a gate oxide film 37 (see FIG. 3), the electric field is applied thereto through the transfer electrode to which the normally low vertical transfer pulse $V\phi 3$, $V\phi 4$ is applied. Accordingly, the reduction in the absolute value of the negative side potential VL' of the normally low vertical transfer pulse $V\phi 3$, $V\phi 4$ leads to the reduction of the electric field being applied to the gate oxide film 37.

As a consequence, while the influence of the increase in the dark current is being suppressed, the electric field being applied to the gate oxide film 37 can be reduced in the manner that the negative side potential VL' of the normally low vertical transfer pulse $V\phi 3$, $V\phi 4$ is set smaller in the absolute value than the negative side potential VL of the normally high vertical transfer pulse $V\phi 1$, $V\phi 2$. Accordingly, the device reliability can be improved, and more specifically, the transfer efficiency of the respective vertical transfer register 14 can be improved.

Although schematically shown in FIGS. 4A to 4D, a time period without waveform variations occurring in either a time period T0 before the time period or a period after that time period is referred to as a "standby time period."

The standby time period is inclusive of at least light receiving and readout time periods. In the light receiving time period, signal charges occurring upon light reception by the light receiver section 12 are stored; and in the readout time period, the signal charges are discharged to the vertical transfer registers 14 through the readout gate section 13.

This is attributed to the configuration shown in FIG. 3, in which the transfer electrode 28 is shared as the gate electrode of the readout gate section 13, such that vertical transfer and light reception are not able to be effected at the same time.

Figure 4:
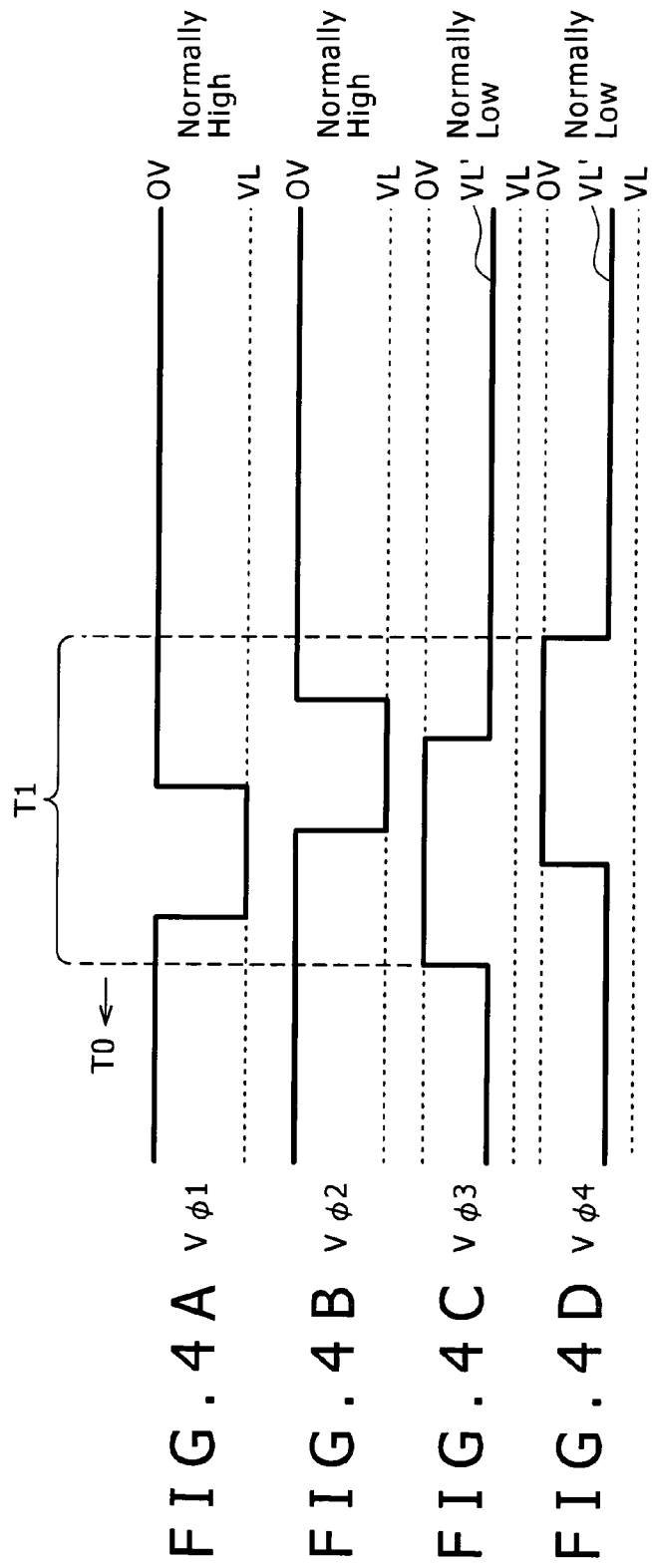
FIGS. 4A to 4D, respectively, are waveform diagrams of four phase-differential vertical transfer pulse trains in the first embodiment.
Figure 5:
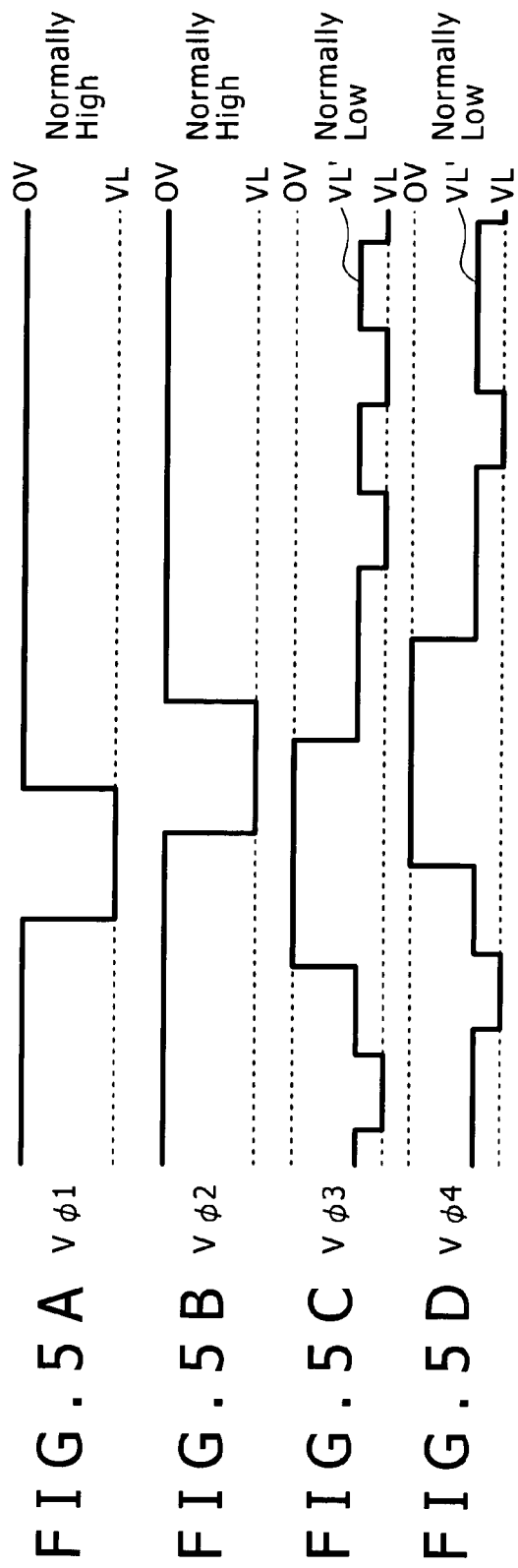
FIGS. 5A to 5D, respectively, are waveform diagrams of four phase-differential vertical transfer pulse trains in the second embodiment.

Thereby, the vertical transfer pulse Vφ1, Vφ2 shown in FIGS. 4A, 4B, respectively, has the standby level set to the positive side potential, and the vertical transfer pulse Vφ3, Vφ4 shown in FIGS. 4C, 4D, respectively, has the standby level set to the negative side potential, in which the respective level is constant.

The vertical transfer pulse Vφ1, Vφ2 corresponds to a "first transfer pulse" in the embodiment according to the present invention, and the vertical transfer pulse Vφ3, Vφ4 corresponds to a "second transfer pulse" in the embodiment according to the present invention.

Thus, the feature of the present embodiment is that the negative side potential VL' of the normally low vertical transfer pulse Vφ3, Vφ4 (second transfer pulse) is set smaller in absolute value than the negative side potential VL of the normally high vertical transfer pulse Vφ1, Vφ2 (first transfer pulse).

As one example, the negative side potential VL' of the vertical transfer pulse Vφ3, Vφ4 is set smaller by about 5% in voltage value than the negative side potential VL of the vertical transfer pulse Vφ1, Vφ2.

The negative side potential VL' of the vertical transfer pulse Vφ3, Vφ4 can be set easily in the manner that the vertical transfer pulse of the "0[V]-VL" amplitude supplied from the TG circuit 18 is divided by, for example, the resistive potential divider circuit in the vertical driver 19. Thereby, a power source dedicated for the negative side potential VL' does not have to be provided.

The potential setting means, however, is not limited to the resistive potential divider circuit in the vertical driver 19. Instead the configuration may be such that, for example, a resistive potential divider circuit may be provided on the semiconductor substrate 21 (see FIG. 3), in which the vertical transfer pulse Vφ3, Vφ4 of a "0[V]-VL'" amplitude is generated in accordance with the vertical transfer pulse of the "0[V]-VL" amplitude supplied from the vertical driver 19.

Thus, the negative side potential VL' of the normally low vertical transfer pulse Vφ3, Vφ4 is set smaller in the absolute value than the negative side potential VL of the normally high vertical transfer pulse Vφ1, Vφ2, and the vertical transfer registers 14 are transfer-driven by the four phase-differential vertical transfer pulse trains Vφ1 to Vφ4 inclusive of the vertical transfer pulses Vφ3 and Vφ4. Thereby, the following effects and advantages can be obtained.

The dark current in the vertical transfer register 14 primiarily occurs under the transfer electrode to which the normally high vertical transfer pulses Vφ1 and Vφ2 are applied. This is attributed to the fact that, in the normally high vertical transfer pulse Vφ1, Vφ2, the duration of the negative side potential is short and the pinning effect duration is short. As such, substantially no influence of the dark current occurs even in the case where the negative side potential VL' of the normally low vertical transfer pulse Vφ3, Vφ4 in which the occurrence amount of the dark current is very small relative to that in the normally high vertical transfer pulse Vφ1, Vφ2 which is somewhat reduced in the absolute value.

On the other hand, however, while the high electric field is applied to the gate oxide film 37 (see FIG. 3), the electric field is applied thereto through the transfer electrode to which the normally low vertical transfer pulse Vφ3, Vφ4 is applied. Accordingly, the reduction in the absolute value of the negative side potential VL' of the normally low vertical transfer pulse Vφ3, Vφ4 leads to the reduction of the electric field being applied to the gate oxide film 37.

As a consequence, while the influence of the increase in the dark current is being suppressed, the electric field being applied to the gate oxide film 37 can be reduced in the manner that the negative side potential VL' of the normally low vertical transfer pulse Vφ3, Vφ4 is set smaller in the absolute value than the negative side potential VL of the normally high vertical transfer pulse Vφ1, Vφ2. Accordingly, the device reliability can be improved, and hence the transfer efficiency of the respective vertical transfer register 14 can be improved.

Setting of the potentials of four phase-differential vertical transfer pulse trains Vφ1 to Vφ4, which is a feature of the present invention, will be described herein below.

FIGS. 4A to 4D, respectively, are waveform diagrams of four phase-differential vertical transfer pulse trains according to the first embodiment.

Referring to the drawings, the four phase-differential vertical transfer pulse trains Vφ1 to Vφ4 are composed of normally high transfer pulses (normally high vertical transfer pulses Vφ1 and Vφ2 in the present embodiment) that each have a longer duration of the positive side potential (0[V] in the present embodiment) than the duration of the negative side potential (negative voltage value VL in the present embodiment), and normally low transfer pulses (vertical transfer pulses Vφ3 and Vφ4 in the present embodiment) that each have a longer duration of the negative side potential than the duration of the positive side potential.

In the event of vertical transfer for driving the vertical transfer registers 14 shown in FIG. 2, the vertical transfer pulse Vφ1, Vφ2 repeats the waveform variations shown in a time period T1, thereby transferring the signal charges from the vertical transfer registers 14 to the side of the horizontal transfer register 15.

Second Embodiment

In the present (second) embodiment, level variations of transfer pulses are intermittently effected. FIGS. 2 and 3 are commonly applied as well to the present embodiment.

FIGS. 5A to 5D, respectively, are waveform diagrams of four phase-differential vertical transfer pulse trains according to the second embodiment.

Referring to the figures, similarly as in the case of the first embodiment, the four phase-differential vertical transfer pulse trains (Vφ1 to Vφ4) are composed of normally high vertical transfer pulses Vφ1 and Vφ2 that each have a longer duration of the positive side potential (0[V] in the present embodiment) than the duration of the negative side potential (negative voltage value VL in the present embodiment), and normally low transfer pulses Vφ3 and Vφ4 that each have a longer duration of the negative side potential than the duration of the positive side potential.

In the second embodiment, a feature is that a negative side potential VL' of the normally low vertical transfer pulse Vφ3, Vφ4 is set intermittently smaller in absolute value than the negative side potential VL of the normally high vertical transfer pulse Vφ1, Vφ2 (the potential VL' is brought close to 0 V). As one example, the negative side potential VL' of the vertical transfer pulse Vφ3, Vφ4 is set intermittently smaller by about 5% in voltage value than the negative side potential VL of the vertical transfer pulses Vφ1 and Vφ2.

However, in the present embodiment, the negative side potential VL' of the normally low vertical transfer pulse Vφ3, Vφ4 (second transfer pulse) is set intermittently smaller in the absolute value than the negative side potential VL of the normally high vertical transfer pulse Vφ1, Vφ2 (first transfer pulse) (the potential VL' is brought close to 0 V).

More specifically, different from the first embodiment, the negative side potential VL' of the normally low vertical transfer pulse Vφ3, Vφ4 is not set all the time smaller in the absolute value than the negative side potential VL of the normally high vertical transfer pulse Vφ1, Vφ2. However, in the present embodiment, the negative side potential VL' is set intermittently smaller in the relative value than the negative side potential VL of the vertical transfer pulse Vφ1, Vφ2, and is set to the negative side potential VL in the remaining time periods.

As one example, the negative side potential VL' of the vertical transfer pulse Vφ3, Vφ4 is set intermittently smaller by about 5% in voltage value than the negative side potential VL of the vertical transfer pulse Vφ1, Vφ2.

The approach according to the second embodiment is effective in a case, such as in the first embodiment, in which the negative side potential VL' of the normally low vertical transfer pulse Vφ3, Vφ4 is set all the time smaller in the absolute value than the negative side potential VL of the normally high vertical transfer pulse Vφ1, Vφ2, whereby causing the increase in the dark current.

That is, different from the first embodiment, the negative side potential VL' of the normally low vertical transfer pulse Vφ3, Vφ4 is not set all the time smaller in the absolute value than the negative side potential VL of the normally high vertical transfer pulse Vφ1, Vφ2. In the present embodiment, however, the negative side potential VL' is set intermittently smaller in the relative value than the negative side potential VL of the vertical transfer pulse Vφ1, Vφ2, and is set to the negative side potential VL in the remaining time periods. In other words, the negative side potential VL' of the normally low vertical pulse Vφ3, Vφ4 is set intermittently greater in the absolute value, and thereby, the interface levels are erased to thereby make it possible to prevent the dark current from increasing.

The pinning effect is intensified by a transition to the negative side potential, and the effect thereof remains for some time. Accordingly, in the event that the negative side potential of the second transfer pulse is intermittently varied, while the pinning effect remains unvaried, the drive capacity is increased.

For the above reasons, compared to the case of the first embodiment, the pulse control method in the present embodiment is capable of maintaining its effects of causing electrons to occur less from the interface level by utilizing the pinning effect.

Concurrently, according to the arrangement in which the negative side potential VL' is set intermittently smaller in the relative value than the negative side potential VL of the vertical transfer pulse, the time period of the application of the high electric field application on the gate oxide film 37 is short compared to the past example where the normally low vertical transfer pulse Vφ3, Vφ4. Consequently, further deterioration in the transfer efficiency of the respective vertical transfer register 14 is reduced more than in the case of the past example.

Thus, the embodiment has been described by exemplifying the case of four-phase driving of the vertical transfer registers 14 by using the four phase-differential vertical transfer pulse trains Vφ1 to Vφ4. However, the present invention is not limited to the adaptation of the four-phase driving, and can be generally adapted to other multiphase driving systems, such as three-phase and six-phase driving systems.

Further, in the embodiment, the driving method has been described with reference to the example case where the vertical transfer registers 14 are provided as driven-object charge transfer sections of the present invention. However, the driving method can be adapted as well to a horizontal transfer register 15 in a configuration where the horizontal transfer register 15 is transfer-driven by multiphase transfer pulses inclusive of a normally high transfer pulse having a longer duration of the positive side potential than the duration of the negative side potential, and a normally low transfer pulse having a longer duration of the negative side potential than the duration of the positive side potential.

Application Example

The CCD solid state imaging device of the respective embodiment described above is well suited for use as an imaging device of any one of imaging apparatuses, such as a digital still camera and a video camera.

In the present example case, the imaging apparatus refers to a camera module (used by being mounted in an electronic apparatus, such as a mobile phone) or a camera system, such as a digital still camera or video camera, including the camera module. The camera module includes a solid state imaging device serving as an imaging device, an optical system for imaging image light of a photographic subject onto an imaging surface (light reception surface) of the solid state imaging device, and a signal processing circuit of the solid state imaging device.

FIG. 10 is a block diagram of an example of the configuration of the image input apparatus in the embodiment according to the present invention. Referring to FIG. 10, the imaging apparatus of the present example is configured to include an optical system including, for example, a lens 6, an imaging device 1, a signal processing circuit 4, and a device driver circuit 2.

The optical system includes the lens 6 that images image light incoming from the photographic subject onto the imaging surface of the imaging device 1. By being driven by the device driver circuit 2, the imaging device 1 outputs, in units of, for example, a field, image signals corresponding to one frame obtained by conversion of the image light, which has been imaged onto the image capture plane through the lens 6, into electric signals in units of the pixel. The CCD solid state imaging device according to the embodiment is used as the imaging device 1.

The signal processing circuit 4 includes, for example, a CDS (correlated double sampling) circuit and an AGC (automatic gain control) circuit, in which processes are performed on image signals output from the imaging device 1 such that, for example, the CDS circuit removes fixed pattern noise contained in the image signals, and the AGC circuit performs stabilization (gain regulation) of the signal levels.

The device driving circuit 2 is configured to include, for example, the TG circuit 18, the vertical driver 19, and the horizontal driver 20, which are shown in FIG. 2. Thereby, the imaging device 1 is driven by using the four phase-differential vertical transfer pulse trains Vφ1 to Vφ4 according to the first or second embodiment. That is, among the four phase-differential vertical transfer pulse trains Vφ1 to Vφ4 according to the first embodiment, the negative side potential VL' of the normally low vertical transfer pulse Vφ3, Vφ4 is set smaller in the absolute value than the negative side potential VL of the normally high vertical transfer pulse Vφ1, Vφ2; and among the four phase-differential vertical transfer pulse trains Vφ1 to Vφ4 according to the second embodiment, the negative side potential VL' of the normally low vertical transfer pulse Vφ3, V$\phi$4 is set intermittently smaller in the absolute value than the negative side potential VL of the normally high vertical transfer pulse V$\phi$1, V$\phi$2.

As described above, in the imaging apparatus, such as the digital still camera or video camera, since the CCD solid state imaging device according to the embodiment is mounted as the imaging device thereof, the reliability of the device can be improved without increasing the dark current in the CCD solid state imaging device, whereby images of high image quality can be obtained.

Figure 6:
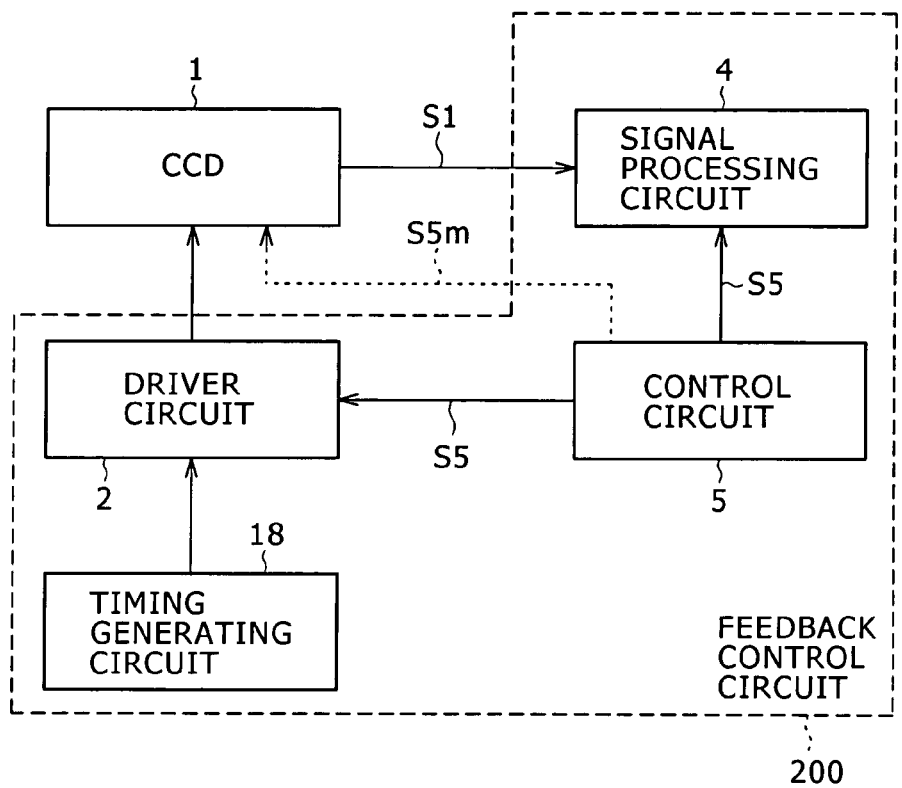
FIG. 6 is a diagram showing, together with the CCD, blocks of a driving device inclusive of a feedback control circuit in the third embodiment.
Figure 7:
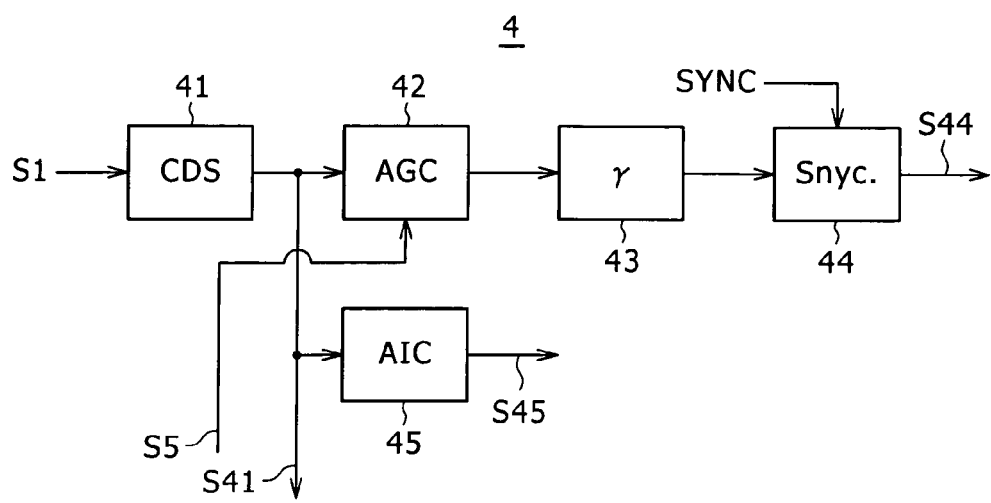
FIG. 7 is a block diagram showing an exemplary configuration of a signal processing circuit.

FIG. 10 is a block diagram of an example of the configuration of an image input apparatus in the embodiment according to the present invention. In the drawing, configurations and signals common to those in FIGS. 6 and 7 are shown with like reference characters, and descriptions thereof are omitted herefrom.

An image input apparatus 50 shown in FIG. 10 is configured to include, for example, the optical system including the lens 6, a diaphragm 7, and diaphragm driving means 8; an imaging device (CCD 1, for example); the driving circuit 2; the signal processing circuit 4; and a control circuit 5.

The optical system uses the diaphragm 7 to restrict the area of image light from a photographic subject and uses the lens 6 to converge the light on the lens 6, thereby forming an image on an imaging surface of an imaging device (CCD 1, for example). By being driven by the device driver circuit 2, the imaging device outputs, in units of, for example, a field, an image signal(s) S1 corresponding to one frame obtained by conversion of the image light, which has been imaged onto the imaging surface through the lens 6, into electric signals in units of the pixel.

In this case, the diaphragm driving means 8 is coupled to the diaphragm 7. The diaphragm driving means 8 is a mechanical driving means that inputs an iris control signal S45 from the AIC (automatic iris control) circuit 45 of the signal processing circuit 4, thereby controlling an aperture amount of the diaphragm 7.

According to the present example, the iris control signal S45 is input into the driver circuit 2 through the control circuit 5, whereby the driver circuit 2 inputs the iris control signal S45 as a "signal depending upon the amount of signal charge, the brightness of the image, or the like." Then, regulation of the positive side potentials according to the first or second embodiment is carried out.

In addition, although not shown in the drawings, also regulation of the positive side potentials in accordance with the gain according to the first or second embodiment can be carried out.

Thus, the optical system, the CCD 1 as the imaging device, the driver circuit 2, and the signal processing circuit 4 and the control circuit 5 which are necessary for feedback control are mounted in the image input apparatus 50. Thereby, the device reliability or the transfer efficiency can be improved without increasing the dark current, consequently enabling images of high image quality to be obtained.

Third Embodiment

In each of the two embodiments described above, the presence or absence of the level variation in accordance with the difference between the standby levels of the transfer pulses is implemented as described above.

However, in a third embodiment, the presence or absence of the level variation of the transfer pulse is controlled by using a feedback in accordance with the image signal S1 output from the CCD 1 in FIG. 2.

FIG. 6 is a diagram showing, together with the CCD 1, blocks of a driving device inclusive of a feedback control circuit.

The driving device shown in the drawing figure includes the driving circuit 2, the TG circuit 18, a signal processing circuit 4, and a control circuit 5 in a feedback control circuit 200 surrounded by the broken line.

Of these components, the driving circuit 2 and the TG circuit 18 are common in basic function and operation to those in the first embodiment (FIG. 2 and the relevant descriptions). Also the CCD 1 is common to that in the first embodiment.

FIG. 7 is a block diagram showing an exemplary configuration of the signal processing circuit 4.

The signal processing circuit 4 shown in the figure include a CDS circuit 41 (correlated double sampling circuit), an AGC circuit 42 (automatic gain control circuit) inclusive of a variable gain amplifier, a gamma correction circuit 43 (shown as "$\gamma$"), a synchronous output circuit 44 (shown as "Sync."), and an AIC circuit 45 (automatic iris control circuit).

The CDS circuit 41 inputs an image signal S1 from the CCD 1 and efficiently eliminates induced noise, specifically, reset noise, contained in the image signal S1.

The AGC circuit 42 inputs a gain control signal S5 from the control circuit 5 in FIG. 6, and regulates the gain of the internal variable gain amplifier. Thereby, the gain regulation of an image signal S41 input from the CDS circuit 41 into the AGC circuit 42 is carried out.

The control circuit 5 in FIG. 6 is capable of inputting the image signal S41 from the CDS circuit 41, thereby detecting the brightness of a screen (imaging screen) that is indicated by the image signal.

Although not specifically shown in the drawing, the control circuit 5 can be configured to include, but not limited to, memory for storing image signals in units of a frame, an averaging (or, integrating) unit, and a CPU. With this configuration, the control circuit 5 obtains the brightness of an imaging screen, calculates a gain of the AGC circuit 42, which gain is suited for the brightness, and outputs information of the gain as a gain control signal S5 to the AGC circuit 42. In the present embodiment, the gain control signal S5 and the control circuit 5, respectively, correspond to an example of a "signal variable corresponding to the amount of the signal charge" and an example of a "means of outputting the signal."

The gamma correction circuit 43 is used to provide brightness compensation to an input signal so that the input signal is adaptable to, for example, equipment coupled with the output thereof.

The synchronous output circuit 44 is used to input a synchronous signal SYNC and in synchronism with the synchronous signal, to supply an output signal S44 to a circuit or integrated circuit located at a rear stage. Depending upon the case or by necessity, the functionality of signal amplification is imparted to the synchronous output circuit 44.

The AIC circuit 45 is used to perform automatic iris regulation. As such, depending on the case or by necessity, the AIC circuit 45 is provided with the function of detecting the brightness of the imaging screen. In the present embodiment, however, the brightness detection function exists in the control circuit 5, so that the brightness information is acquired therefrom, and the iris control signal S45 is created in accordance with the brightness information to be output.

The above-described gamma correction circuit 43, synchronous output circuit 44, and AIC circuit 45, and CDS circuit 41 described earlier are not indispensable for the configuration.

Level regulation corresponding to the brightness of the imaging screen will be described with reference to waveform diagrams of FIGS. 8A and 8B.

The regulation is carried out by the vertical driver 19 of FIG. 2. The level regulation is provided on the normally high transfer pulse, namely, the vertical transfer pulse V$\phi$1, V$\phi$2 having the standby level at the positive side potential.

FIGS. 8A and 8B representatively show the vertical transfer pulse V$\phi$1. Although not specifically shown, the vertical transfer pulse V$\phi$2 is similarly controlled.

FIG. 8A shows the waveform of the vertical transfer pulse V$\phi$1 in the event that the imaging screen is relatively bright, and FIG. 8B shows the waveform of the vertical transfer pulse V$\phi$1 in the event that the imaging screen is relatively dark.

In the event that the imaging screen is relatively bright, the gain is set relatively low in the gain control signal S5. Conversely, in the event that the imaging screen is relatively dark, the gain is set high in the gain control signal S5. While thus carrying out automatic gain control, the AGC circuit 42 is either capable of restricting the amount of signals handleable by, for example, circuits coupled at rear stages and the video display section or capable of making noise inconspicuous.

In the event that the gain is relatively low (the imaging screen relatively bright), the amount of signal charges occurring in the CCD 1 is relatively large, so that the signal-to-noise ratio (S/N ratio) is not reduced even with some amount of the dark current. Accordingly, the positive side potential (0[V] in the present embodiment), i.e., the standby level, remains as it is, as shown in FIG. 8A. Thereby, when the amount of signal charges is large, since the amount of charges being handled in vertical transfer is not reduced, the transfer efficiency is not reduced. Consequently, the occurrence of untransferred residual charges in the event of transfer can be prevented.

On the other hand, in the event that the gain is relatively is high (the imaging screen is relatively dark), the amount of signal charges to be transferred is relatively small. As such, even when the waveheight value is reduced, untransferred residual charges, for example, do not occur, therefore enabling efficient transfer. For this reason, as shown in FIG. 8B, control is carried out to somewhat reduce the positive side potential from 0[V].

For the amount of the reduction, an optimal value is available corresponding to an average amount of signal charges (brightness of the imaging screen) and the amount of increase of the dark current. In the present embodiment, the negative side potential is reduced from 0[V] to −1[V]. In addition, the amount of the reduction (amount of level variation) is arbitrary, and in the event that a threshold value for detecting the image brightness is varied and the gain is regulated corresponding to the threshold value, the amount of level variation can be varied in units of a gain or a gain range. As one example, the regulation can be regulated from 0[V] to −0.5 [V], −1[V], −1.5[V], or −2[V].

In FIGS. 8A and 8B, the negative side potential (negative side potential VL=−7.5[V]) is the same.

However, the first and second embodiments for causing level variation of the negative side potential can be executed by being combined together.

The effects of the positive side potential regulation will be described with reference to FIG. 9.

FIG. 9 is a graph showing a positive side potential (VH) dependency of the degree of white noise (units: arbitrary units (a.u.)) on the display screen.

For a practical display screen, voltage variations resulting in white noise (white noise dots) in the event that video signals of the same type are input are classified into ranks, and the degree of white noise is managed by using an allowable number of white noise dots in the respective rank and a total number thereof in all the ranks.

The graph shows three kinked lines respectively corresponding to three CCDs.

As can be seen from the graph, the positive side potential (VH) is reduced from 0[V] to −1[V], thereby reducing the number of white noise dots.

Thus, according to the present embodiment, when the signal amplitude gain not influencing the vertical transfer is high, the positive side potential (VH) of the first transfer pulse (normally high vertical transfer pulse V$\phi$1, V$\phi$2) is varied so that the waveheight value is reduced. Thereby, the pinning effect can be intensified and the dark current can be reduced without reducing the transfer efficiency.

Consequently, the S/N ratio in the event of a dark screen captured can be improved. Further, in this event, the waveheight value of the transfer charges can be reduced, so that power consumption corresponding to the reduction is reduced.

Fourth Embodiment

The driving device for the CCD according to the embodiment described above is well suited for use as an IC for driving an imaging device of any number of image input apparatuses, such as a digital still camera and a video camera.

In the present example case, the imaging input apparatus refers to a camera module (used by being mounted in an electronic apparatus, such as a mobile phone) or a camera system, such as a digital still camera or video camera, including the camera module. The camera module includes a solid state imaging device serving as an imaging device, an optical system for imaging image light of a photographic subject onto an imaging surface (light reception surface) of the solid state imaging device, and a signal processing circuit of the solid state imaging device.

FIG. 10 is a block diagram of an example of the configuration of the image input apparatus in the embodiment according to the present invention. In the drawing, configurations and signals common to those in FIGS. 6 and 7 are shown with like reference characters, and descriptions thereof are omitted herefrom.

Referring to FIG. 10, the imaging input apparatus shown with numeral 50, of the present example (embodiment), is configured to include, for example, an optical system including, for example, a lens 6, a diaphragm 7, and a diaphragm driving means 8, an imaging device (CCD 1, for example), a driver circuit 2, a signal processing circuit 4, and a control circuit 5.

The optical system uses the diaphragm 7 to restrict the area of image light from a photographic subject and uses the lens 6 to converge the light on the lens 6, thereby forming an image on an imaging surface of the imaging device (CCD 1, for example). By being driven by the device driver circuit 2, the imaging device (CCD 1, for example) outputs, in units of, for example, the field, an image signal(s) S1 corresponding to one frame obtained by conversion of the image light, which has been imaged onto the imaging surface through the lens 6, into electric signals in units of the pixel.

In this case, the diaphragm driving means 8 is coupled to the diaphragm 7. The diaphragm driving means 8 is a mechanical driving means that inputs an iris control signal S45 from the AIC (automatic iris control) circuit 45 of the signal processing circuit 4, thereby controlling an aperture amount of the diaphragm 7.

According to the present example, the iris control signal S45 is input into the driver circuit 2 through the control circuit 5, whereby the driver circuit 2 inputs the iris control signal S45 as a "signal depending upon the amount of signal charge, the brightness of the image, or the like." Then, regulation of the positive side potentials according to the fourth embodiment is carried out.

In addition, although not shown in the drawings, regulation of the positive side potentials in accordance with the gain according to the third embodiment can be carried out.

Thus, the optical system, the CCD 1 as the imaging device, the driver circuit 2, the signal processing circuit 4 and the control circuit 5 which are necessary for feedback control are mounted in the image input apparatus 50. Thereby, the device reliability or the transfer efficiency can be improved without increasing the dark current, consequently enabling images of high image quality to be obtained.

Finally, a noise reduction method for further reducing noise in accordance with, for example, the gain of the third embodiment and iris control of the present embodiment, and by reducing power consumption of an "output circuit" and a configuration therefor will be described herebelow.

The "output circuit" is a circuit formed in the peripheral section 10 of, for example, CCD 1 of FIG. 2 (which can be a CMOS sensor, in the present embodiment).

Noise causing noise, such as white noise, is increased not only by the above-described dark current generated by the CCD 1 itself, but also by heat generation in portions of circuits (especially, the output circuit) in association with an increase of power consumption. That is, the noise is increased by thermal noise. As such, it is important to suppress not only the dark current, but also the thermal noise. In particular, in an event of imaging a night scene, in which the exposure time is set to as long as several hundreds of milliseconds (msec), noise reduction in the output circuit is indispensable.

In addition, the frequency characteristic of the output circuit should be increased to a high band zone in order to optimize the output circuit corresponding to a high data rate. However, the output circuit having been driven at a high frequency in response to an input high frequency is likely to cause thermal noise with increased power consumption. That is, the S/N ratio of the circuit itself is reduced. Further, the heat generated in the output circuit transfers to the entirety of the imaging device, such that the dark current also increases correspondingly thereto.

As such, in the present embodiment, power consumption of the output circuit is restricted, thereby suppressing the occurrence of high frequency noise components together with the thermal noise generated by heat generation are suppressed and concurrently making the dark current less occur.

As a driving method for a CCD, there are two operation modes, namely, a high data rate motion-image imaging mode and a low data rate still-image, imaging mode.

In particular, for a CCD for use with a digital still camera (DSC), a mode for imaging still images to be recorded and stored and a monitoring mode for displaying motion images on a monitor screen for the sake of performing, for example, focusing and framing in advance of still-image imaging are indispensable. Further, a motion-image imaging mode also is provided for a camera of the type capable of performing motion-image imaging.

The output circuit mounted on-chip in the output circuit is designed to optimally operate in the high data rate motion-image imaging mode in which the maximum capacity has to be exhibited. The monitoring mode also is a motion-image mode, such that a data rate higher than in the still-image imaging mode is demanded.

However, in the event of imaging a still image, the data rate can be reduced lower than that for a motion image, since the output circuit optimized for the motion-image imaging mode enters a state exceeding the specification, and unnecessary or lost power consumption and heat generation are introduced, hence resulting in a reduction in the S/N ratio.

The following describes a method for suppressing the lost power consumption and associated unnecessary dynamic range enhancement to suppress heat generation and to improve the S/N ratio, and a configuration for realizing the method.

The present description will be directed in particular to shifting of the circuit configuration between the monitoring mode and the still-image imaging mode under the assumption of using a DSC. In the description below, the "monitoring mode" may be replaced with the "motion-image imaging mode."

It is further assumed that the CCD configuration is the same as that shown in FIGS. 2 and 3, and FIGS. 6, 7, and 10 are applicable for portions other than the CCD.

It is further assumed that the mode shifting is performed by the control circuit 5 of FIG. 6, and, as shown by the dotted line therein, a mode shift signal S5$m$ is supplied from the control circuit 5 to the output circuit of the CCD 1.

The control circuit 5 sets the monitoring mode with timing following, for example, a power-on operation. Then, upon completion of, for example, focusing to thereby accomplish proper focusing on a photographic subject, the mode momentarily shifts to the still-image imaging mode.

Figure 11A:
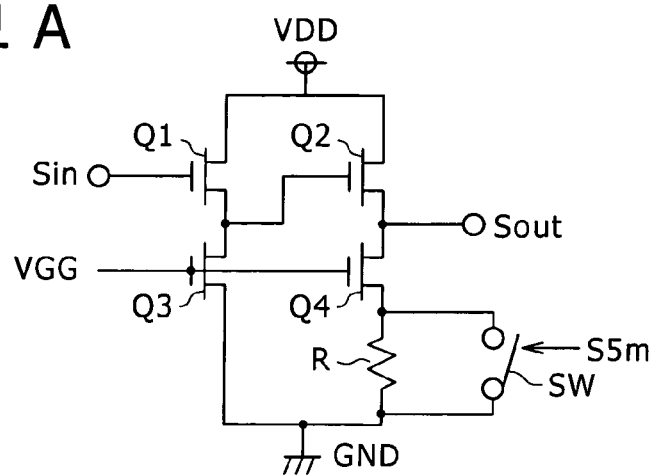
FIGS. 11A and 11C, respectively, are circuit diagrams of CCD output circuits.
Figure 11B:
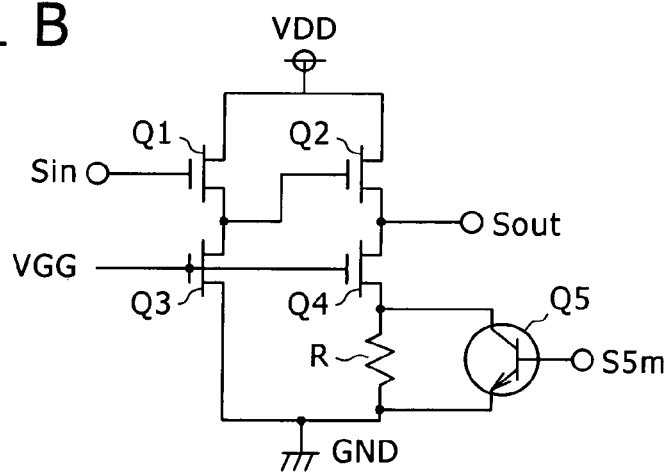
Figure 11C:
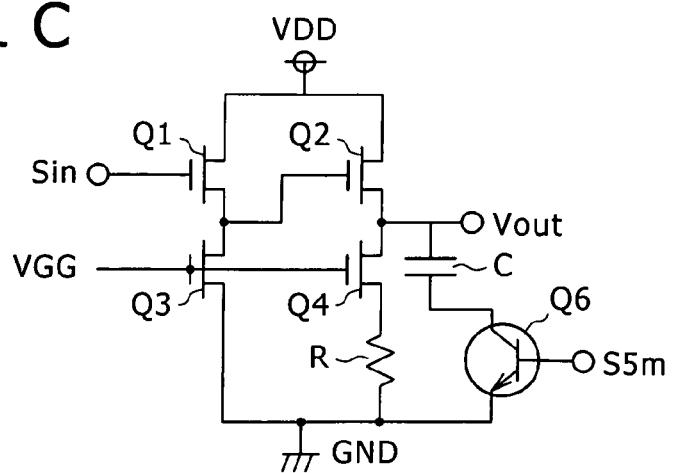

FIGS. 11A to 11C, respectively, show exemplary configurations of output circuits.

The respective output circuit is configured to include two source follower circuits. More specifically, the output circuit includes two NMOS transistors, namely, a signal-inputting NMOS transistor Q1 and a signal-outputting NMOS transistor Q2. The signal-inputting NMOS transistor Q1 inputs an input signal Sin through its gate, and has the drain coupled to a supply line of a power supply voltage Vdd. In the signal-outputting NMOS transistor Q2, the gate is coupled to the source of the signal-inputting NMOS transistor Q1, and the drain is coupled to the supply line of the power supply voltage Vdd, whereby an output signal Sout is output from the source.

In the configuration of FIGS. 11A, 11B, a load transistor Q3 formed of an NMOS transistor is coupled between the source of the signal-inputting NMOS transistor Q1 and a ground voltage GND. In addition, a load transistor Q4 formed of an NMOS transistor and a resistor R (which can be a variable resistor) are connected between the source of the signal-outputting NMOS transistor Q2 and the ground voltage GND. A switch is connected parallel to the resistor R. The load transistor Q3, Q4 works as a resistor that is determined by a bias voltage. As such, variations of the bias voltage VGG make the transistor work as a variable resistor.

In the configuration of FIG. 11B, the above-described switch is formed of a bipolar transistor Q5. In FIG. 11A, as indicated by "SW" implying a general switch, the type of the switch is not limited.

In either of the cases, the switch SW or the bipolar transistor Q5 is controlled by the mode shift signal S5$m$ supplied from the control circuit 5 of FIG. 6, for example.

More specifically, the switch SW or the bipolar transistor Q5 is turned on in the monitoring mode in which the gain is not increased; whereas, the switch SW or the bipolar transistor Q5 is turned off in the still-image imaging mode in which the gain is increased.

In the monitoring mode, since the image is viewed on the small monitor screen, the image quality can be degraded, and the gain is not increased. As such, since the frequency responsivity of the output circuit does not have to be high, the current for flowing to the resistor is bypassed to thereby suppress heat generation. In this event the current flowing to the signal-inputting NMOS transistor Q1 and the load transistor Q4 is offset from an optimal value, and also output current is reduced. In the still-image imaging mode, however, since the image is recorded, the image quality is not able to be degraded, such that the gain is increased. For this reason, also, the frequency responsivity of the output circuit should be set highest. As such, the resistor is inserted into the circuit, thereby setting a bias condition optimized by the bias voltage VGG. Thereby, the current is flowed to the resistor R, heat generation is caused, and hence the power consumption also is increased.

With the operations described above, lost or useless heat generation and power consumption are reduced, and whereby the S/N ratio can be improved.

In the output circuit shown in FIG. 11C, the resistor R is omitted, but a capacitor C and a bipolar transistor Q6 are instead coupled between an output node and the ground voltage GND. Similarly to the bipolar transistor Q5 of FIG. 11B, the bipolar transistor Q6 is controlled by the mode shift signal S5$m$.

The bipolar transistor Q6 is turned on in the monitoring mode, but is turned off in the still-image imaging mode.

Consequently, in the monitoring mode, the frequency responsivity of the output signal Sout to the input signal Sin is reduced, and noise is reduced by band restriction. However, power consumption, heating value, and the like for charging the capacitor C do not vary so much.

With the control described above added to the respective first to fourth embodiments, an advantage is produced in that the S/N ratio can be further improved.

The respective first to fourth embodiments have thus been described with reference to the exemplary case of the four-phase driving of the vertical transfer registers 14 by using the four phase-differential vertical transfer pulse trains V$\phi$1 to V$\phi$4. However, the present invention is not limited to being adapted to the four-phase driving, but can be all other multiphase driving systems, such as three-phase and six-phase driving systems.

Further, in the embodiment, the driving method has been described with reference to the example case where the vertical transfer registers 14 are provided as driven-object charge transfer sections of the present invention. However, the driving method can be adapted as well to a horizontal transfer register 15 in a configuration where the horizontal transfer register 15 is transfer-driven by multiphase transfer pulses inclusive of a normally high transfer pulse having a longer duration of the positive side potential than the duration of the negative side potential, and a normally low transfer pulse having a longer duration of the negative side potential than the duration of the positive side potential.

It should be understood by those skilled in the art that various modifications, combinations, sub-combinations and alterations may occur depending on design requirements and other factors insofar as they are within the scope of the appended claims or the equivalents thereof.

What is claimed is:

1. A solid state imaging device comprising:
   a transfer channel configured to receive signal charges from light receiver sections during a standby time period, a normally-low transfer pulse and a normally-high transfer pulse being adapted to control a propagation of the signal charges along said transfer channel during a charge transfer time period,
   wherein said normally-high transfer pulse during said charge transfer time period changes between a positive-side voltage and a negative-side voltage, said negative-side voltage being more negative than said positive-side voltage,
   wherein said normally-low transfer pulse during said charge transfer time period changes between a positive-side potential and a negative-side potential, said negative-side potential being more negative than said positive-side potential,
   wherein during said charge transfer time period, said negative-side potential is smaller in an absolute value than said negative-side voltage and said normally-low transfer pulse changes between said negative-side potential and said negative-side voltage.

2. A solid state imaging device according to claim 1, wherein said negative-side potential is less than 0V, said negative-side voltage being less than 0V.

3. A solid state imaging device according to claim 1, wherein said positive-side potential does not exceed 0V, said positive-side voltage not exceeding 0V.

4. A solid state imaging device according to claim 1, wherein throughout said standby time period, said normally-high transfer pulse and said normally-low transfer pulse each do not exceed 0V.

5. A solid state imaging device according to claim 1, wherein a phase of the normally-high transfer pulse differs from a phase of the normally-low transfer pulse.

6. A solid state imaging device according to claim 1, wherein a time duration of the normally-high transfer pulse at said negative-side voltage is shorter than a time duration of the normally-high transfer pulse at said positive-side voltage.

7. A solid state imaging device according to claim 1, wherein a time duration of the normally-low transfer pulse at said negative-side potential is longer than a time duration of the normally-low transfer pulse at said positive-side potential.

8. A solid state imaging device according to claim 1, wherein said light receiver sections convert light into said signal charges, said signal charge corresponding to an intensity of said light incident upon said light receiver sections.

9. A solid state imaging device according to claim 1, wherein a positive-side voltage is the highest voltage level of the normally-high transfer pulse during said charge transfer time period, said positive-side potential not exceeding 0V.

10. A solid state imaging device according to claim 9, wherein during said charge transfer time period, said normally-low transfer pulse transitions between said negative-side potential and said positive-side potential.

11. A solid state imaging device according to claim 1, wherein a positive-side potential is the highest voltage level of the normally-low transfer pulse during said charge transfer time period, and said positive-side voltage not exceeding 0V.

12. A solid state imaging device according to claim 11, wherein during said charge transfer time period, said normally-high transfer pulse transitions between said negative-side voltage and said positive-side voltage.

13. An imaging apparatus comprising:
   the solid state imaging device according to claim 1; and
   an optical system configured to guide image light from a photographic subject onto an imaging surface of the solid state imaging device.

14. A driving method for a driving method, the method comprising:
   receiving signal charges from light receiver sections during a standby time period, a normally-low transfer pulse and a normally-high transfer pulse controlling a propagation of the signal charges along a transfer channel during a charge transfer time period, wherein said normally-high transfer pulse during said charge transfer time period changes between a positive-side voltage and a negative-side voltage, said negative-side voltage being more negative than said positive-side voltage, wherein said normally-low transfer pulse during said charge transfer time period changes between a positive-side potential and a negative-side potential, said negative-side potential being more negative than said positive-side potential, wherein during said charge transfer time period, said negative-side potential is smaller in an absolute value than said negative-side voltage and said normally-low transfer pulse changes between said negative-side potential and said negative-side voltage.

15. A driving method according to claim 14, wherein said negative-side potential is less than 0V, said negative-side voltage being less than 0V.

16. A driving method according to claim 14, wherein said positive-side potential does not exceed 0V, said positive-side voltage not exceeding 0V.

17. A driving method according to claim 14, wherein throughout said standby time period, said normally-high transfer pulse and said normally-low transfer pulse each do not exceed 0V.

18. A driving method according to claim 14, wherein a phase of the normally-high transfer pulse differs from a phase of the normally-low transfer pulse.

19. A driving method according to claim 14, wherein a time duration of the normally-high transfer pulse at said negative-side voltage is shorter than a time duration of the normally-high transfer pulse at said positive-side voltage.

20. A driving method according to claim 14, wherein a time duration of the normally-low transfer pulse at said negative-side potential is longer than a time duration of the normally-low transfer pulse at said positive-side potential.

21. A driving method according to claim 14, wherein said light receiver sections convert light into said signal charges, said signal charge corresponding to an intensity of said light incident upon said light receiver sections.

22. A driving method according to claim 14, wherein a positive-side voltage is the highest voltage level of the normally-high transfer pulse during said charge transfer time period, said positive-side potential not exceeding 0V.

23. A driving method according to claim 22, wherein during said charge transfer time period, said normally-low transfer pulse transitions between said negative-side potential and said positive-side potential.

24. A driving method according to claim 14, wherein a positive-side potential is the highest voltage level of the normally-low transfer pulse during said charge transfer time period, and said positive-side voltage not exceeding 0V.

25. A driving method according to claim 24, wherein during said charge transfer time period, said normally-high transfer pulse transitions between said negative-side voltage and said positive-side voltage.

* * * * *